Jan. 31, 1950
D. M. LAWRENCE
2,495,976
LUBRICANT METERING SYSTEM
Filed Oct. 23, 1944
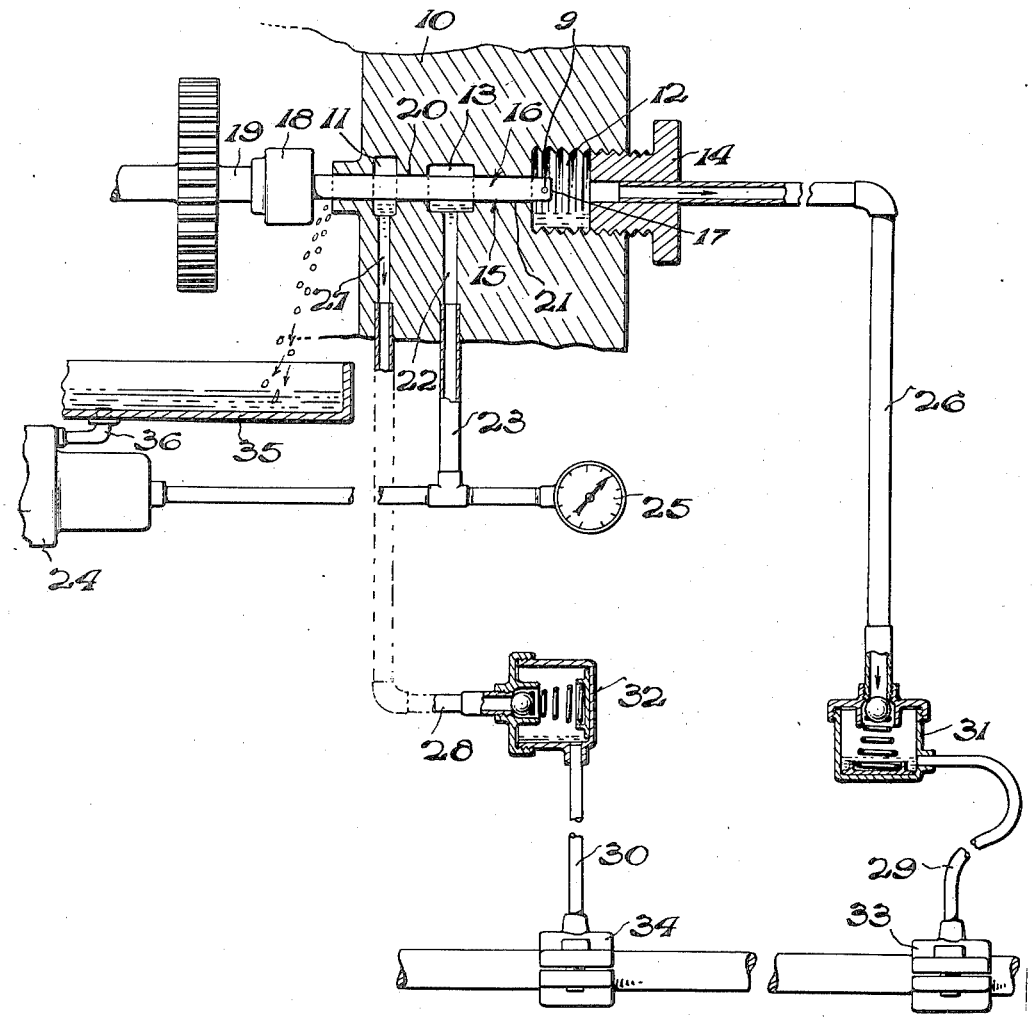
INVENTOR.
Donald M. Lawrence
BY
Robert F. Beck
ATTORNEY Patented Jan. 31, 1950

2,495,976

UNITED STATES PATENT OFFICE 2,495,976

LUBRICANT METERING SYSTEM

Donald M. Lawrence, Newark, N. J., assignor to Bendix Aviation Corporation, Teterboro, N. J., a corporation of Delaware Application October 23, 1944, Serial No. 559,872

1 Claim. (Cl. 184—7)

My invention relates to lubrication and more particularly to a device and system for metering lubricant to bearings and the like.

One of the objects of my invention is to provide means for metering lubricant which is so constructed and arranged as to insure the metering of lubricant to a bearing at a substantially constant pressure.

Another object of my invention is to provide a device of the foregoing described character which is equipped with means for maintaining the device in an opened condition against clogging to effect a free flow of the lubricant.

Another object of my invention is to provide a device of the foregoing described character equipped with replaceable means whereby to permit the amount of lubricant metered to be changed and/or the use of a lubricant of a different viscosity.

Another object of my invention is to provide a lubricating system equipped with means to preclude syphoning of the lubricant from the system when the latter is not in operation.

A further object of my invention is to provide a system of the foregoing described character which is simple in construction, durable in use, efficient in operation and economical in manufacture.

With the above and other objects in view, as will hereinafter appear, the invention consists in combination, and arrangement of parts hereinafter set forth and illustrated in the accompanying drawings, from which the several features of the invention and the advantages attained thereby will be readily understood by those skilled in the art.

In the drawing, the single figure is a diagrammatic sectional view of my invention.

As illustrated in the drawing, a portion of a housing 10 is provided with a pair of spaced outwardly disposed distributing chambers 11 and 12, respectively, and a receiving chamber 13 between the chambers 11 and 12. The chamber 12 is provided with a removable threaded plug 14. The chambers 11, 12 and 13 communicate with each other through a bore or metering orifice 15 containing a replaceable metering pin or shaft 16.

The inner end 17 of the metering pin terminates within the chamber 12 and is provided with a tool receiving opening 9 while the opposite end extends outwardly through the housing and is detachably connected by a coupling 18 to a drive shaft 19 which serves to effect rotation of the metering pin therewith. The diameter of the bore 15, between the chambers 11, 12 and 13, is slightly greater than that of the metering pin 16 to provide metering passages 20 and 21 between the chamber 13 and the chambers 11 and 12, respectively. The diameters of the passages 20 and 21 may be coincident or different dependent upon the diameter of the portions of the metering pin extending therethrough.

The receiving chamber 13 communicates with a channel 22 formed in the housing, said channel being connected by means of a supply pipe 23 to a source of lubricant supply 24 under pressure. The pipe 23 is provided with a fitting to which is connected a lubricant pressure gauge 25. The plug 14 is provided with a central bore in which is connected a lubricant supply pipe 26 for distributing lubricant from the chamber 12.

The chamber 11 communicates with a channel 27 formed in the housing and to which is connected a lubricant supply pipe 28. The lubricant supply pipes 26 and 28 are connected to lubricant feed pipes 29 and 30 through the medium of check valves 31 and 32 respectively. The lubricant feed pipes 29 and 30 are connected to bearings 33 and 34 respectively whereby lubricant is supplied to said bearings in metered quantities as hereinafter more fully described. Beneath the outer or left end of the metering pin 16, there is provided a sump 35 whereby any lubricant which might leak outwardly about the metering pin discharges into the sump and is returned to the source through a conduit 36.

In operation, a lubricant such as oil, is introduced under pressure into the chamber 13 from the source 24 through the supply pipe 23, the pressure being normally sufficient to effect introduction of the oil into the chambers 12 and 11 through the passages 20 and 21, respectively, the rotation of the pin 16 within the passages serving to preclude clogging of the passages by foreign matter or the like. From the chambers 12 and 11, the lubricant is introduced into the feed pipes 29 and 30 through the supply pipes 26 and 28 and the check valves 31 and 32. From the feed pipes 29 and 30 the lubricant is introduced into the bearings 33 and 34, the check valves 31 and 32 being responsive to the pressure of the lubricant to permit introduction. When the system is not in operation the check valves operate to prevent drainage or syphoning of the oil out of the system through the supply pipes. By removing the plug 14, the pin 16 may be replaced by another having portions, extending through the passages 20 and 21, of different diameter, thereby permitting the amount of oil metered to the bearings to be changed and/or the use of an oil of a different viscosity.

During normal operation, lubricant from the chamber 13 will be metered to the bearings 33 and 34 under a pressure less than the pressure in the chamber 13. If for any reason, discharge of the lubricant to the bearings is retarded or prevented, for instance, by clogging or the like, sufficient pressure will be built up in the supply lines to overcome the undesirable condition.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claim.

What is claimed is:

In a system for metering lubricant to bearing means, the combination of check valve means, a housing including a bore having, in series therealong in the order named, an end journal opening, a first distribution chamber, a metering section, a receiving chamber, a second metering section, and an opposite-end distribution chamber; a metering pin in the bore coaxially therewith providing a metering orifice about the pin in each of said metering sections and extending counter to said series from said second metering section to a position beyond said journal opening for cooperation with means adapted to impart definite rotation to the pin about its axis during the metering of the lubricant through said orifices, a source of lubricant supply, a sump communicating with said source adapted to receive leakage lubricant from said journal opening, conduit means adapted to conduct lubricant under pressure from said source to said receiving chamber, and means including pipe-line means providing for passage of the lubricant from said distribution chambers to the bearing means through the check valve means.

DONALD M. LAWRENCE.

REFERENCES CITED

The following references are of record in the file of this patent:

UNITED STATES PATENTS

| Number | Name | Date |
| --- | --- | --- |
| 1,257,258 | Lemp | Feb. 19, 1918 |
| 1,497,503 | Grenter | June 10, 1924 |
| 1,632,771 | Bijur | June 14, 1927 |
| 1,764,467 | Portis | June 17, 1930 |
| 1,862,488 | Bijur | June 7, 1932 |
| 1,862,513 | Bijur | June 7, 1932 |
| 1,943,014 | Gleason | Jan. 9, 1934 |
| 2,009,430 | Bijur | July 30, 1935 |
| 2,229,655 | Kocher | Jan. 28, 1944 |
| 2,353,734 | Kocher | July 18, 1944 |

FOREIGN PATENTS

| Number | Country | Date |
| --- | --- | --- |
| 579,489 | Germany | June 29, 1933 |